(12) United States Patent
Eberlein et al.

(10) Patent No.: US 12,499,116 B2
(45) Date of Patent: Dec. 16, 2025

(54) REFACTORING WORKBENCH WITH MIGRATION SUPPORT

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/508,705

(22) Filed: Nov. 14, 2023

(65) Prior Publication Data

US 2025/0156433 A1   May 15, 2025

(51) Int. Cl.
| | | |
|---|---|---|
| *G06F 15/16* | (2006.01) | |
| *G06F 16/21* | (2019.01) | |
| *G06F 16/22* | (2019.01) | |
| *G06F 16/2458* | (2019.01) | |

(52) U.S. Cl.
CPC ........ *G06F 16/2474* (2019.01); *G06F 16/217* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,739,387 B2 | 6/2010 | Eberlein et al. | |
| 8,126,919 B2 | 2/2012 | Eberlein | |
| 8,225,303 B2 | 7/2012 | Wagner et al. | |
| 8,291,038 B2 | 10/2012 | Driesen | |
| 8,301,610 B2 | 10/2012 | Driesen et al. | |
| 8,375,130 B2 | 2/2013 | Eberlein et al. | |
| 8,380,667 B2 | 2/2013 | Driesen | |
| 8,402,086 B2 | 3/2013 | Driesen et al. | |
| 8,407,297 B2 | 3/2013 | Schmidt-Karaca et al. | |
| 8,434,060 B2 | 4/2013 | Driesen et al. | |
| 8,467,817 B2 | 6/2013 | Said et al. | |

(Continued)

OTHER PUBLICATIONS

U.S. Appl. No. 16/688,941, filed Nov. 19, 2019, Auer et al.

(Continued)

*Primary Examiner* — Alex Gofman
(74) *Attorney, Agent, or Firm* — Fish & Richardson P.C.

(57) ABSTRACT

The disclosure generally describes methods, software, and systems for re-architecting an existing software product provided as a service. A user input specifying current databases used for an old software product version is received. The user input includes a definition of a target persistency layout including databases assigned for storing a new software product version, the old software product version including one or more database tables and the new software product version including an adjustment to the one or more database tables to generate one or more target database tables. Sizes of the one or more database tables are read from a catalog of a database. A migration assessment of the new software product version is generated based on the sizes of the one or more database tables. A migration test of the one or more database tables is executed using the migration assessment to generate migration test results. An updated adjustment to the one or more database tables is provided based on the migration test results.

20 Claims, 6 Drawing Sheets

(56) References Cited

U.S. PATENT DOCUMENTS

| | | |
|---|---|---|
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,501,516 B2 | 11/2016 | Driesen |
| 9,519,675 B2 | 12/2016 | Specht et al. |
| 9,582,562 B2 | 2/2017 | Driesen et al. |
| 9,639,448 B2 | 5/2017 | Gebhard et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,800,689 B2 | 10/2017 | Said et al. |
| 9,830,138 B2 | 11/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,055,215 B2 | 8/2018 | Specht et al. |
| 10,061,788 B2 | 8/2018 | Said et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,191,733 B2 | 1/2019 | Driesen et al. |
| 10,230,708 B2 | 3/2019 | Eberlein |
| 10,268,472 B2 | 4/2019 | Eberlein et al. |
| 10,268,692 B2 | 4/2019 | Mayer et al. |
| 10,270,743 B2 | 4/2019 | Eberlein |
| 10,291,704 B2 | 5/2019 | Eberlein et al. |
| 10,296,324 B2 | 5/2019 | Burkhardt et al. |
| 10,298,591 B2 | 5/2019 | Eberlein et al. |
| 10,303,665 B2 | 5/2019 | Engelko et al. |
| 10,311,030 B1 * | 6/2019 | Barnes .................... G06F 16/27 |
| 10,417,205 B2 | 9/2019 | Specht et al. |
| 10,419,445 B2 | 9/2019 | Eberlein et al. |
| 10,437,795 B2 | 10/2019 | Eberlein et al. |
| 10,452,646 B2 | 10/2019 | Schlarb et al. |
| 10,482,080 B2 | 11/2019 | Auer et al. |
| 10,491,700 B2 | 11/2019 | Eberlein |
| 10,496,401 B2 | 12/2019 | Eberlein et al. |
| 10,505,832 B2 | 12/2019 | Eberlein et al. |
| 10,523,662 B2 | 12/2019 | Eberlein |
| 10,534,585 B1 | 1/2020 | Eberlein et al. |
| 10,536,461 B2 | 1/2020 | De Boer et al. |
| 10,621,167 B2 | 4/2020 | Auer et al. |
| 10,642,609 B1 | 5/2020 | Eberlein et al. |
| 10,656,933 B2 | 5/2020 | Radermacher et al. |
| 10,657,276 B2 | 5/2020 | Birn et al. |
| 10,659,449 B2 | 5/2020 | Eberlein |
| 10,673,962 B2 | 6/2020 | Mueller et al. |
| 10,684,999 B2 | 6/2020 | Mayer et al. |
| 10,685,007 B2 | 6/2020 | Eberlein et al. |
| 10,686,882 B2 | 6/2020 | Eberlein et al. |
| 10,693,989 B2 | 6/2020 | Eberlein et al. |
| 10,700,949 B1 | 6/2020 | Eberlein |
| 10,706,170 B2 | 7/2020 | Specht et al. |
| 10,713,277 B2 | 7/2020 | Auer et al. |
| 10,715,405 B2 | 7/2020 | Eberlein |
| 10,733,168 B2 | 8/2020 | Schlarb et al. |
| 10,740,315 B2 | 8/2020 | Birn et al. |
| 10,740,318 B2 | 8/2020 | Auer et al. |
| 10,762,075 B2 | 9/2020 | Eberlein et al. |
| 10,789,220 B2 | 9/2020 | Mayer et al. |
| 10,846,284 B1 * | 11/2020 | Park .................... G06F 16/283 |
| 10,853,693 B2 | 12/2020 | Eberlein et al. |
| 10,871,962 B2 | 12/2020 | Burkhardt et al. |
| 10,891,217 B2 | 1/2021 | Eberlein et al. |
| 10,915,551 B2 | 2/2021 | Hauck et al. |
| 10,936,624 B2 | 3/2021 | Kruempelmann et al. |
| 10,942,892 B2 | 3/2021 | Driesen et al. |
| 10,956,150 B2 | 3/2021 | Eberlein et al. |
| 10,977,212 B2 | 4/2021 | Eberlein et al. |
| 10,983,762 B2 | 4/2021 | Eberlein et al. |
| 11,030,164 B2 | 6/2021 | Eberlein et al. |
| 11,036,754 B2 | 6/2021 | Specht et al. |
| 11,050,820 B2 | 6/2021 | Odenheimer et al. |
| 11,106,816 B2 | 8/2021 | Eberlein et al. |
| 11,119,883 B1 | 9/2021 | Eberlein et al. |
| 11,121,943 B2 | 9/2021 | Eberlein et al. |
| 11,153,394 B1 | 10/2021 | Eberlein et al. |
| 11,206,305 B1 | 12/2021 | Eberlein et al. |
| 11,218,388 B2 | 1/2022 | Eberlein |
| 11,232,126 B2 | 1/2022 | Meissner et al. |
| 11,237,821 B1 | 2/2022 | Hoeft et al. |
| 11,249,812 B2 | 2/2022 | Eberlein et al. |
| 11,269,620 B1 | 3/2022 | Hoeft et al. |
| 11,269,717 B2 | 3/2022 | Eberlein et al. |
| 11,310,328 B2 | 4/2022 | Eberlein |
| 11,347,873 B2 | 5/2022 | Eberlein |
| 11,354,302 B2 | 6/2022 | Eberlein et al. |
| 11,368,547 B2 | 6/2022 | Eberlein |
| 11,379,211 B2 | 7/2022 | Kruempelmann et al. |
| 11,379,217 B1 | 7/2022 | Eberlein et al. |
| 11,405,472 B2 | 8/2022 | Eberlein et al. |
| 11,409,719 B2 | 8/2022 | Eberlein |
| 11,418,550 B1 | 8/2022 | Eberlein et al. |
| 11,438,437 B1 | 9/2022 | Eberlein et al. |
| 11,451,537 B2 | 9/2022 | Eberlein |
| 11,461,322 B1 * | 10/2022 | Plenderleith ........ G06F 16/2456 |
| 11,463,309 B1 | 10/2022 | Eberlein et al. |
| 11,537,364 B2 | 12/2022 | Eberlein et al. |
| 11,551,141 B2 | 1/2023 | Driesen |
| 11,561,836 B2 | 1/2023 | Eberlein et al. |
| 11,561,956 B2 | 1/2023 | Auer et al. |
| 11,687,670 B2 | 6/2023 | Eberlein et al. |

(56) References Cited

U.S. PATENT DOCUMENTS

| | | |
|---|---|---|
| 11,693,945 B2 | 7/2023 | Engler et al. |
| 11,704,430 B2 | 7/2023 | Eberlein et al. |
| 11,720,342 B2 | 8/2023 | Eberlein et al. |
| 11,734,160 B2 | 8/2023 | Eberlein et al. |
| 11,797,879 B2 | 10/2023 | Eberlein et al. |
| 2008/0092130 A1* | 4/2008 | Maeda ............... G06F 9/44505 707/999.101 |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2011/0145197 A1* | 6/2011 | Kamohara ............. G06F 16/20 707/E17.007 |
| 2011/0154445 A1 | 6/2011 | Schmidt-Karaca et al. |
| 2012/0023233 A1* | 1/2012 | Okamoto ........... G06F 9/45558 709/226 |
| 2012/0136839 A1 | 5/2012 | Eberlein et al. |
| 2013/0085810 A1 | 4/2013 | Driesen et al. |
| 2013/0144918 A1 | 6/2013 | Said et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0149158 A1 | 5/2014 | Odenheimer et al. |
| 2014/0164963 A1 | 6/2014 | Klemenz et al. |
| 2014/0372981 A1 | 12/2014 | Said et al. |
| 2015/0188890 A1 | 7/2015 | Said et al. |
| 2015/0220576 A1 | 8/2015 | Eberlein |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0098253 A1 | 4/2016 | Hutzel et al. |
| 2016/0127325 A1 | 5/2016 | Odenheimer et al. |
| 2017/0161291 A1 | 6/2017 | Specht et al. |
| 2017/0161511 A1 | 6/2017 | Eberlein et al. |
| 2017/0171233 A1 | 6/2017 | Odenheimer et al. |
| 2017/0192758 A1* | 7/2017 | Apte .......................... G06F 8/76 |
| 2017/0329505 A1 | 11/2017 | Richter et al. |
| 2018/0041568 A1 | 2/2018 | Eberlein |
| 2018/0121236 A1 | 5/2018 | Odenheimer et al. |
| 2018/0300332 A1 | 10/2018 | Odenheimer et al. |
| 2019/0129997 A1 | 5/2019 | Auer et al. |
| 2019/0340260 A1 | 11/2019 | Eberlein et al. |
| 2019/0340282 A1 | 11/2019 | Zimmermann et al. |
| 2020/0175336 A1 | 6/2020 | Eberlein et al. |
| 2020/0183812 A1 | 6/2020 | Eberlein et al. |
| 2020/0195527 A1 | 6/2020 | Eberlein |
| 2020/0225940 A1 | 7/2020 | Eberlein et al. |
| 2020/0304385 A1 | 9/2020 | Eberlein |
| 2020/0351367 A1 | 11/2020 | Eberlein |
| 2020/0364604 A1 | 11/2020 | Eberlein et al. |
| 2021/0073411 A1 | 3/2021 | Eberlein et al. |
| 2021/0176280 A1* | 6/2021 | Jayanthi ................... G06F 8/34 |
| 2021/0182108 A1 | 6/2021 | Eberlein et al. |
| 2021/0182251 A1 | 6/2021 | Eberlein et al. |
| 2021/0385136 A1 | 12/2021 | Misch et al. |
| 2022/0108206 A1 | 4/2022 | Driesen et al. |
| 2022/0217208 A1 | 7/2022 | Eberlein et al. |
| 2022/0292420 A1 | 9/2022 | Eberlein et al. |
| 2022/0300490 A1 | 9/2022 | Eberlein et al. |
| 2022/0335031 A1 | 10/2022 | Eberlein et al. |
| 2022/0391305 A1 | 12/2022 | Eberlein et al. |
| 2022/0398258 A1 | 12/2022 | Eberlein et al. |
| 2023/0019160 A1 | 1/2023 | Eberlein |
| 2023/0041514 A1 | 2/2023 | Eberlein et al. |
| 2023/0068439 A1 | 3/2023 | Hoeft et al. |
| 2023/0119834 A1 | 4/2023 | Driesen |
| 2023/0169528 A1 | 6/2023 | Eberlein et al. |
| 2023/0195422 A1 | 6/2023 | Eberlein et al. |
| 2023/0252009 A1 | 8/2023 | Hauck et al. |
| 2023/0315723 A1 | 10/2023 | Eberlein et al. |
| 2023/0325377 A1 | 10/2023 | Eberlein et al. |
| 2023/0350915 A1* | 11/2023 | Ranjan ................. G06F 16/214 |
| 2024/0281416 A1* | 8/2024 | Vasa ..................... G06F 16/214 |

OTHER PUBLICATIONS

U.S. Appl. No. 17/938,101, filed Oct. 5, 2022, Eberlein et al.
U.S. Appl. No. 17/979,423, filed Nov. 2, 2022, Eberlein et al.
U.S. Appl. No. 17/983,045, filed Nov. 8, 2022, Eberlein.
U.S. Appl. No. 18/048,578, filed Oct. 21, 2022, Eberlein et al.
U.S. Appl. No. 18/191,343, filed Mar. 28, 2023, Eberlein et al.
U.S. Appl. No. 18/209,234, filed Jun. 13, 2023, Eberlein.
U.S. Appl. No. 18/242,103, filed Sep. 5, 2023, Nutakki et al.
U.S. Appl. No. 18/298,634, filed Apr. 11, 2023, Eberlein et al.
U.S. Appl. No. 18/298,661, filed Apr. 11, 2023, Eberlein.
U.S. Appl. No. 18/327,370, filed Jun. 1, 2023, Eberlein et al.
U.S. Appl. No. 18/488,159, filed Oct. 17, 2023, Eberlein et al.
U.S. Appl. No. 18/491,350, filed Oct. 20, 2023, Eberlein et al.
U.S. Appl. No. 18/498,674, filed Oct. 31, 2023, Eberlein et al.
U.S. Appl. No. 18/508,714, filed Nov. 14, 2023, Eberlein.
U.S. Appl. No. 18/508,695, filed Nov. 14, 2023, Eberlein et al.
Help.Sap.com [online] "Creating Virtual Tables" Jan. 2018, retrieved on Nov. 14, 2023, retrieved from URL <https://help.sap.com/docs/SAP_HANA_PLATFORM/6b94445c94ae495c83a19646e7c3fd56/91e5edbfb2144301abc0085984dce8a7.html?version=1.0.12>, 2 pages.
Help.Sap.com [online] "Data Type Conversion" Jan. 2018, retrieved on Nov. 14, 2023, retrieved from URL <https://help.sap.com/docs/SAP_HANA_PLATFORM/4fe29514fd584807ac9f2a04f6754767/46ff9650c7f44461a6146269c1e2a4c6.html>, 3 pages.

* cited by examiner

REFACTORING WORKBENCH WITH MIGRATION SUPPORT

TECHNICAL FIELD

The present disclosure relates to re-architecting an existing software product provided as a service.

BACKGROUND

Software products provided as a service (called "Software-as-Service" (SaaS)) having a large customer base can undergo re-architecting processes. Such re-architecting can be performed for moving to a new platform (re-platforming), cleaning up architectural debt, restructuring microservice layout to implement learning or support further use cases, or various other reasons. Considering a new software product architecture, migrating an existing customer base from a previous software product version can be difficult, costly and have a significant impact on consumption of a software product by customers. A common problem associated with migration for re-architecting processes includes extended downtimes during migration. The extended downtimes can be a risk for the continued success of the software product.

SUMMARY

Implementations of the present disclosure are directed to re-architecting an existing software product provided as a service. More particularly, implementations of the present disclosure are directed to a data migration architecture workbench (DMAW), which enables refactoring an application persistency with migration impact analysis provided early during software product development.

In some implementations, a method includes: receiving, by one or more processors, a user input specifying current databases used for an old software product version, the user input including a definition of a target persistency layout including databases assigned for storing a new software product version, the old software product version including one or more database tables and the new software product version including an adjustment to the one or more database tables to generate one or more target database tables; reading, by the one or more processors, sizes of the one or more database tables from a catalog of a database; generating, by the one or more processors, a migration assessment of the new software product version based on the sizes of the one or more database tables; executing, by the one or more processors, a migration test of the one or more database tables using the migration assessment to generate migration test results; and providing, by the one or more processors, an updated adjustment to the one or more database tables based on the migration test results.

The foregoing and other implementations can each optionally include one or more of the following features, alone or in combination. In particular, implementations can include all the following features:

In a first aspect, combinable with any of the previous aspects, wherein displaying, by the one or more processors, structured query language (SQL) views of the old software product version. In another aspect, the adjustment to the one or more database tables includes at least one of a modification of a table structure or a database type. In another aspect, the adjustment to the one or more database tables includes applying an operation to the one or more database tables. In another aspect, the operation includes at least one of a merge or a split of the one or more database tables. In another aspect, the migration test results include migration parameters including migration durations of migration phases and a migration volume weight for the one or more database tables to be moved to a target database. In another aspect, the migration volume weight includes an identification of source database instances and target database instances of a same type including a largest migration volume weight. In another aspect, the migration assessment is executed using scenarios defined based on a structure of the old software product version. In another aspect, the scenarios define transformations to the one or more database tables based on one or more determined limitations of the one or more database tables.

Other implementations of the aspect include corresponding systems, apparatus, and computer programs, configured to perform the actions of the methods, encoded on computer storage devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Implementations described in the present disclosure, provide technical advantages that address limitations of traditional migration processes. For example, implementations of the present disclosure provide technologies that enable re-architecting of software products to incorporate new design ideas, while creating a software product, into which the current data base can be migrated easily. Migration tailored re-architecting of software products can be implemented based on an impact of a re-design on migration early in the development process. An advantage of the described technology is that it provides a toolset that enables software product development relative to migration cost (e.g., in terms of expense of technical resources, such as memory, processing power, bandwidth) of each intended change and supports the generation of migration code for early testing. Another advantage of the described technology is that the testing results can be used to optimize actual migration to minimize migration downtime and migration cost.

The details of one or more implementations of the subject matter of the specification are set forth in the accompanying drawings and the description below. Other features, aspects, and advantages of the subject matter can become apparent from the description, the drawings, and the claims.

DESCRIPTION OF DRAWINGS

Like reference symbols in the various drawings indicate like elements.

DETAILED DESCRIPTION

Figure 1:
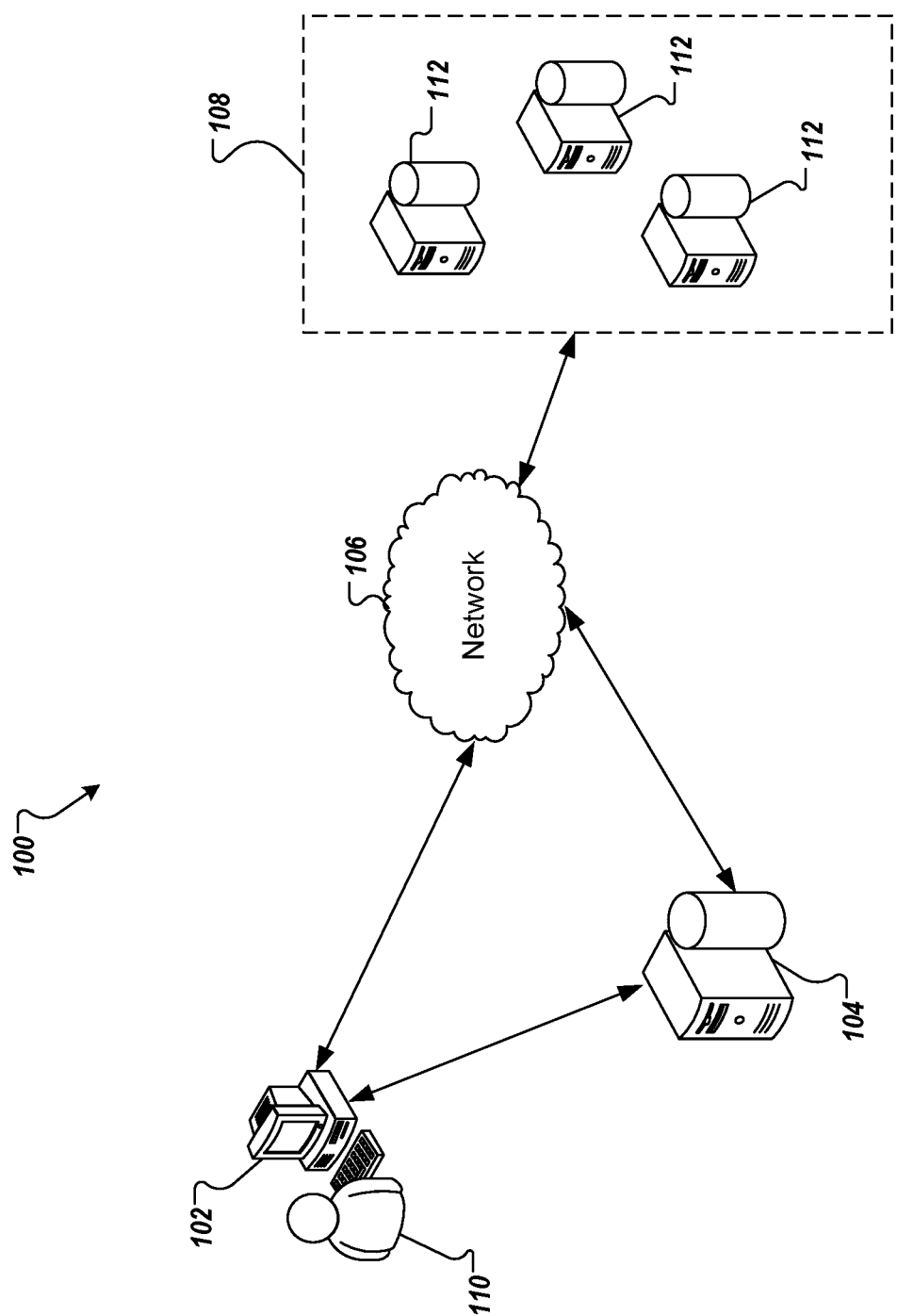
FIG. 1 depicts an example architecture in accordance with implementations of the present disclosure.

Implementations of the present disclosure are directed to directed to re-architecting an existing software product provided as a service. More particularly, implementations of the present disclosure are directed to a data migration architecture workbench (DMAW), which enables refactoring an application persistency with migration impact analysis provided early during software product development. As described in further detail herein, implementations of the present disclosure provide, among other features, receiving a user input specifying current databases used for an old software product version. The user input includes a definition of a target persistency layout including databases assigned for storing a new software product version. The old (source) software product version includes one or more database tables and the new software product version includes an adjustment to the one or more database tables to generate one or more target database tables. The sizes of the one or more database tables are read from a catalog of a database. A migration assessment of the new software product version is generated based on the sizes of the one or more database tables. A migration test of the one or more database tables is generated to guide an updated adjustment to the one or more database tables based on the migration test results.

Addressing the limitations of traditional software product development that was generated independent of a potential migration, the active migration assessment of the new software product version enables adjustments of data structures and service layout to minimize impact on a customer base and to ease migration. Traditionally, migration of an existing data base from an older (source) software product version to a newer (target) version was difficult, costly, and had a significant impact on consumption of the software product by customers, especially during the extended downtimes of migration. Such traditional lengthy migration downtimes are perceived as detrimentally impacting a cloud-computing experience. Implementations of the present disclosure provide an intermediary path: re-architecting the software product to incorporate new design ideas, while creating a software product, into which the current data base can be migrated easily. Migration tailored re-architecting of software products can be implemented based on an impact of a re-design on migration early in the development process. An advantage of the described technology is that it provides a toolset that enables software product development relative to migration cost (e.g., in terms of expense of technical resources, such as memory, processing power, bandwidth) of each intended change and supports the generation of migration code for early testing, as well as optimized actual migration with minimal downtime.

To provide further context for implementations of the present disclosure, re-architecting a Software-as-Service" (SaaS) software product can be triggered by one or more conditions. An example condition can include receiving a request to use new or different infrastructure (e.g., Kubernetes instead of Cloud Foundry). Another example condition can include receiving a request to externalize and run serverless occasionally used parts of the services). Another example condition can include receiving a request to use a different provider for an infrastructure as a service (IaaS) or a platform as a service (PaaS), offering different database services. Another example condition can include receiving a request to use a new database vendor or to use a new database type (e.g., a multi-model database instead of several specialized databases (time series, graph, relational), or vice versa). Another example condition can include receiving a request to externalize large objects from the database and store them in an object store (e.g., a migration of a first database (e.g., Mongo database) to a second database (e.g., PostgreSQL and IaaS object store). Another example condition can include receiving a request to change a structure of implemented microservices, combining previously separate microservices into one or, on the contrary, splitting one microservice into several independent microservices. As each microservice can have its own database, such changes can imply changing the database layout and shuffling tables around between multiple databases (potentially of different types).

Within the context for implementations of the present disclosure, re-architecting is described in view of persistence re-design and the impact on data migration of existing customer tenants for implementation of a new software product versions. The described implementations provide a data migration architecture workbench (DMAW), which enables refactoring an application persistency with a migration impact analysis provided early during software product development. Accordingly, the DMAW is implemented to reduce migration cost (e.g., in terms of expense of technical resources, such as memory, processing power, bandwidth) and to accelerate the migration process (which can significantly affect the customer's ability to maintain continued enterprise operations). In view of the foregoing, and as introduced above, implementations of the present disclosure provide a modeling environment for data migration to evaluate and assess the impact of changes, to provide an updated adjustment to the one or more database tables based on the migration test results, and to use modeling results in order to generate migration scripts right from within the environment.

FIG. 1 depicts an example architecture 100 in accordance with implementations of the present disclosure. In the depicted example, the example architecture 100 includes a client device 102, a server 104, a network 106 and a server system 108. The server system 108 includes one or more server devices 112. In the depicted example, respective users 110 interact with the client devices 102. In an example context, a user 110 can include a user, who interacts with an application that is hosted by the server 104 or the server system 108. In another example context, a user 110 can include a software developer, who interacts with the server system 108 to perform one or more software development adjustments relative to migration procedures, described in further detail herein.

In some examples, the user 110 is an employee of an enterprise and the server 104 can be located within the physical confines of the enterprise (e.g., in a data center operated by or behalf of the enterprise). In some examples, the server 104 includes at least one server and at least one data store. In the example of FIG. 1, the server 104 is intended to represent various forms of servers including, but not limited to a web server, an application server, a proxy server, a network server, and/or a server pool. In general, the server 104 accept requests for application services from client device 102 directly or over the network 106. In some examples, the server 104 is run and maintained by the enterprise. In some examples, an application executed server 104 is provided by a vendor, and can be maintained, modified, and/or extended according to particular user input requests.

In some examples, the client device 102 can communicate with the server 104 and/or the server system 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 112 includes at least one server and at least one data store. In the example of FIG. 1, the server devices 112 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server systems 108 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server 104 or the server system 108. For example, applications hosted on the server 104 are referred to as on-premises applications, and applications hosted on the server system 108 are referred as cloud applications. That is, the server system 108 provides a cloud platform, on which cloud-based applications are provisioned.

With respect to on-premises applications, the user 110 can interact with an application hosted on the server 104 using the client device 102. More specifically, a session can be established between the client device 102 and the server 104, during which session the user 110 is able to interact with one or more applications hosted on the server 104. The one or more applications can enable the user to interact with data stored in one or more databases of the server 104 and/or of the server system 108. In some examples, interactions can result in data being stored to the database, deleted from the database, and/or edited within the database.

In some instances, and as discussed in further detail herein, a migration is to occur to migrate from use of an old software product version (e.g., an on-premises application) to a new software product version (e.g., a cloud application). For example, and with continued reference to FIG. 1, the software product development can include replacement of an old version with a new version associated with a migration of data from the server system 108. As introduced above, implementations of the present disclosure provide a migration analyzer and transition recommendation engine for migration of data. More particularly, implementations of the present disclosure provide a semi-automated process to support software product development relative to migration. In some examples, the target application configuration can be defined and, based on this definition, differences and deviations between layouts with respect to migration impact are analyzed. The migration process can be defined by a migration code that can be used to test and evaluate migration performance to identify if some intended changes can be avoided as they are too costly or if there is still budget left for additional re-factorings. The migration code can also be used to perform the actual migration process.

Figure 2A:
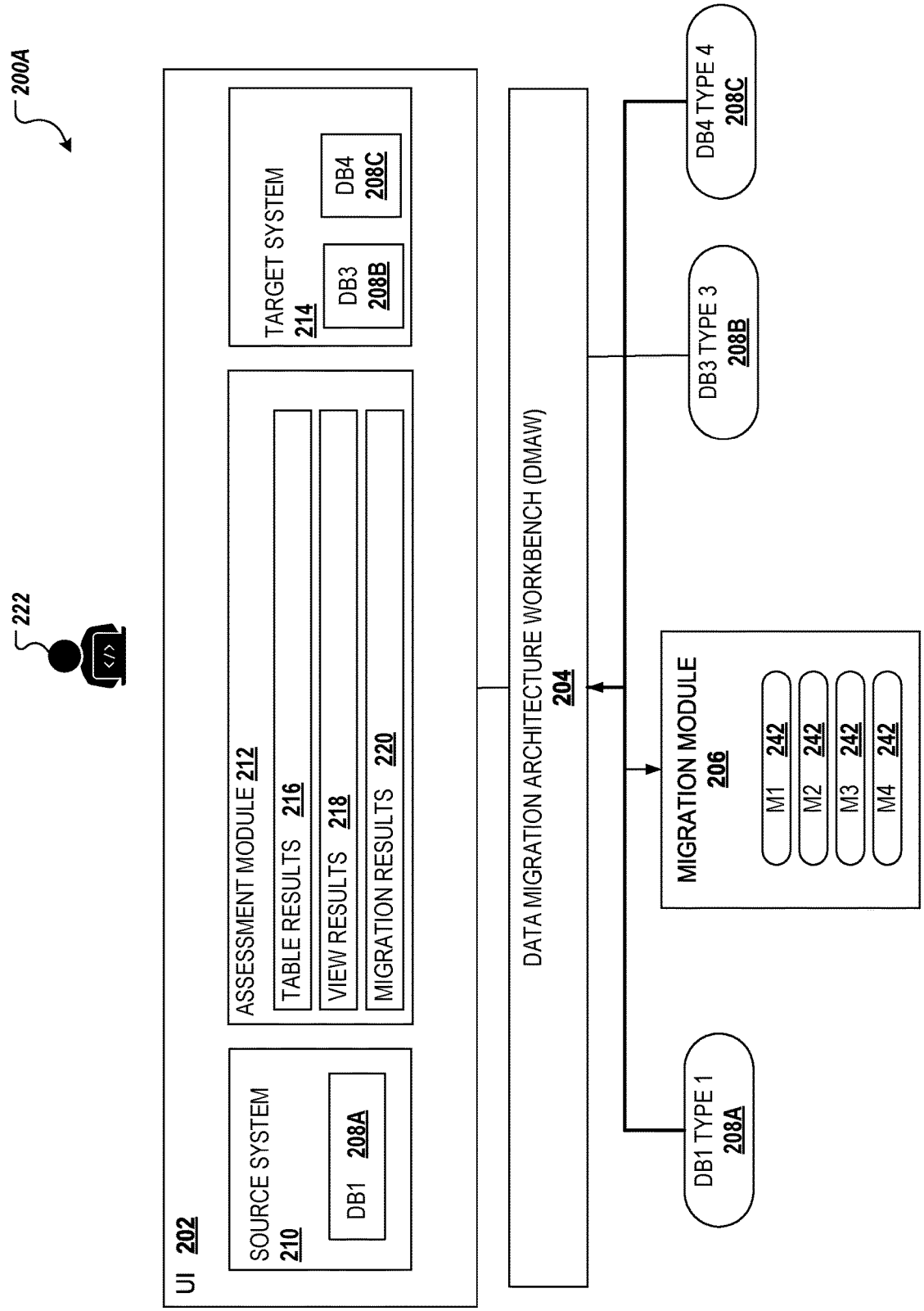
FIGS. 2A-2C schematically depict portions of the example architecture, in accordance with implementations of the present disclosure.

FIG. 2A schematically depicts a portion of an example architecture 200A for DMAW enabling a refactoring process in accordance with implementations of the present disclosure. The example architecture 200A includes a refactoring support user interface (UI) 202, a DMAW 204 (e.g., executed by the server 104 and/or the server system 108 described with reference to FIG. 1), a migration module 206 (e.g., executed by the server 104 and/or the server system 108 described with reference to FIG. 1), a database of type 1 208A, a database (DB) of type 3 208B and a database of type 4 208C.

The refactoring support UI 202 includes a source system 210, an assessment module 212, and a target system 214. The source system 210 includes a reference to the database of type 1 208A. The assessment module 212 includes table results 216, view results 218, and migration results 220. The target system 214 includes a reference to the database of type 3 208B and to the database of type 4 208C.

In accordance with implementations of the present disclosure, the DMAW 204 is configured to manage and control the refactoring process. The DMAW 204 can communicate with UI 202 to read source catalogs from databases 208A, visualize tables per used databases 208A, 208B 208C on the UI 202, provide recommendations for display, by the UI 202, to support a user 222 (software developer) to assign tables to target databases 208B 208C, splitting and merging tables, and generate target database table create statements. The statements can be amended by the user 222 (software developer).

The DMAW 204 can communicate with UI 202 to supports an assessment of a planned database layout with respect to migration impact: The planned database layout including a table size and row-count per table, can be displayed, by the UI 202, to provide insight into the expected migration load. In addition, the volume of a planned database 208A, 208B 208C can be analyzed, relative to migration cost, for a planned migration from one database instance to another. The database types of source system 210 and target system 214 can be analyzed. The DMAW 204 can provide a recommendation which database instances can be migrated "in-place" (avoiding data transfer database instances) in response to determining that the database types of source system 210 and target system 214 are the same type.

The DMAW 204 can read SQL views and SQL queries used by the source system 210 (e.g., the database of type 1 208A) and can transmit the read SQL views and SQL queries to UI 202, for display. The display of the SQL views and SQL queries can support the user 222 to create an assessment of the views and SQL statements on the target databases of type 3 and 4 208B 208C. The assessment can include an indication of whether the views can be created, and SQL statements can be executed (e.g., all required database tables and fields are present). Depending on the capabilities of the user database type (e.g., SAP HANA, provided by SAP SE of Walldorf, Germany), the DMAW 204 can support the refactoring process, by suggesting and generating virtual tables for database side remote access to enable query of content in other database instances.

The DMAW 204 can communicate with the migration module 206, to generate migration code to perform the actual data migration. The actual data migration can include two phases. The first phase can include an online migration of most of the data during use of the source system 210. The second phase can include an offline migration with a relatively short (e.g., less than a set number of hours, such as 3 hours) downtime, during which the remaining, most recently created data is migrated and a switch-over to the target system 214 is performed. The migration code can be used to test and evaluate migration performance to identify if some intended changes (identified as having highest cost) can be avoided or if additional re-factorings can be implemented to further minimize the migration cost below a set threshold. The migration code can be used to perform the actual migration if additional re-factorings are determined as being unnecessary (if the migration cost is below the set migration cost threshold).

Figure 2B:
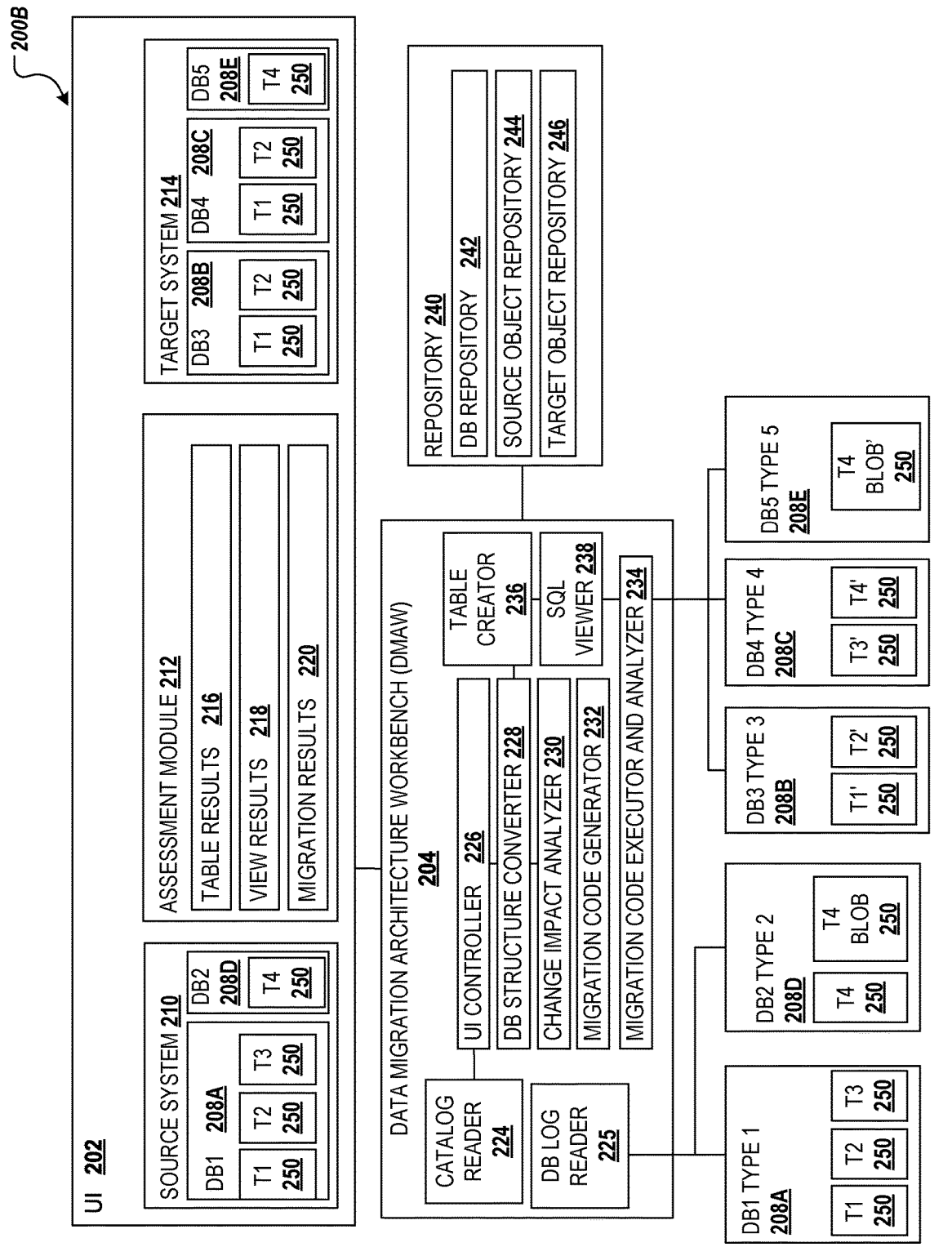

FIG. 2B schematically depicts a portion of an example architecture 200B for DMAW enabling a refactoring process in accordance with implementations of the present disclosure. The example architecture 200B illustrates details of the components of the DMAW 204 used to estimate database sizes that can affect a migration process. The example architecture 200B includes the refactoring support user interface UI 202, the DMAW 204, a repository 240, a database of type 1 208A, a database of type 2 208D, a database (DB) of type 3 208B, a database of type 4 208C, and a database of type 5 208E.

The DMAW 204, as illustrated in FIG. 2B includes a catalog reader 224, a database log reader 225, a UI controller 226, a database structure converter 228, a change impact analyzer 230, a migration code generator 232, a migration code executor and analyzer 234, a table creator 236, and an SQL viewer 238. The catalog reader 224 can read the database catalog to retrieve, which tables 250 (e.g., tables T1 having a first format type, tables T2 having a second format type, tables T3 having a third format type) and SQL views are present in a database instance (e.g., databases 208A, 208D). The catalog reader 224 can read database table size and database table row-count. The database log reader 225 can read SQL statements being executed from database logs, with the statement definition and execution success or failure result. For example, the database log reader 225 can process, the SQL statements to determine what fields they access and their respective (joint) operations to determine if moving a full or part of a table 250 to a different database can affect (e.g., break) the respective SQL statement. The database structure converter 228 can compute a database table and SQL view to create a statement for a particular target database type, having as input the database table or SQL view definition of the source database type. The database structure converter 228 can provide the computed table data to the table creator 236. The table creator 236 can execute database table create statements in a provided database instance using the received the computed table data. The table creator can 236 provide feedback about the create statement success or failure. The SQL view creator 238 can execute SQL view create statements in a provided database instance. The SQL viewer 238 can provide feedback about the create statement success or failure. The migration code generator 232 can generate migration code, that is provided as input (one or several) to source system 210 to migrate from a database 208A, 208D a table instance (s) 250 to a database 208B, 208C, 208E of the target system 214.

The repository 240 includes a database repository 242, a source object repository 244, and a target object repository 246. The database repository 242 can manage storage of configuration information about database instances of the source system 210 and the target system 214. The source object repository 244 242 can manage storage of the database objects read from the database instances 208A, 208D, tables 250, SQL views of the source system 210. The target object repository 246 can manage storage of the database objects read from the database instances 208B, 208C, 208E, tables 250, SQL views of the target system 214. The database repository 242 can transmit the configuration information about database instances to the DMAW 204.

The change impact analyzer 230 of the DMAW 204 can process the configuration information to determine an impact of migration of a group of tables 250 according to their size. The change impact analyzer 230 can compute, if a view can be created in the target database, with respect to the used tables (other checks can be performed by using the table creator 236). The change impact analyzer 230 can compute, if an SQL query can be executed in the target database 208B, 208C, 208E with respect to the used tables 250.

In response to determining, by the change impact analyzer 230 that views can be created and SQL query can be executed, the change impact analyzer 230 can transmit a trigger to the migration code executor and analyzer 234 to execute the migration code generated with a provided set of source databases 208A, 208D (including data. e.g., a copy of customer tenants). The migration code executor and analyzer 234 can evaluate migration code success or failure. The migration code executor and analyzer 234 can determine migration cost by measuring migration code runtime and resource consumption (e.g., input/output (I/O), CPU, and network).

Figure 2C:
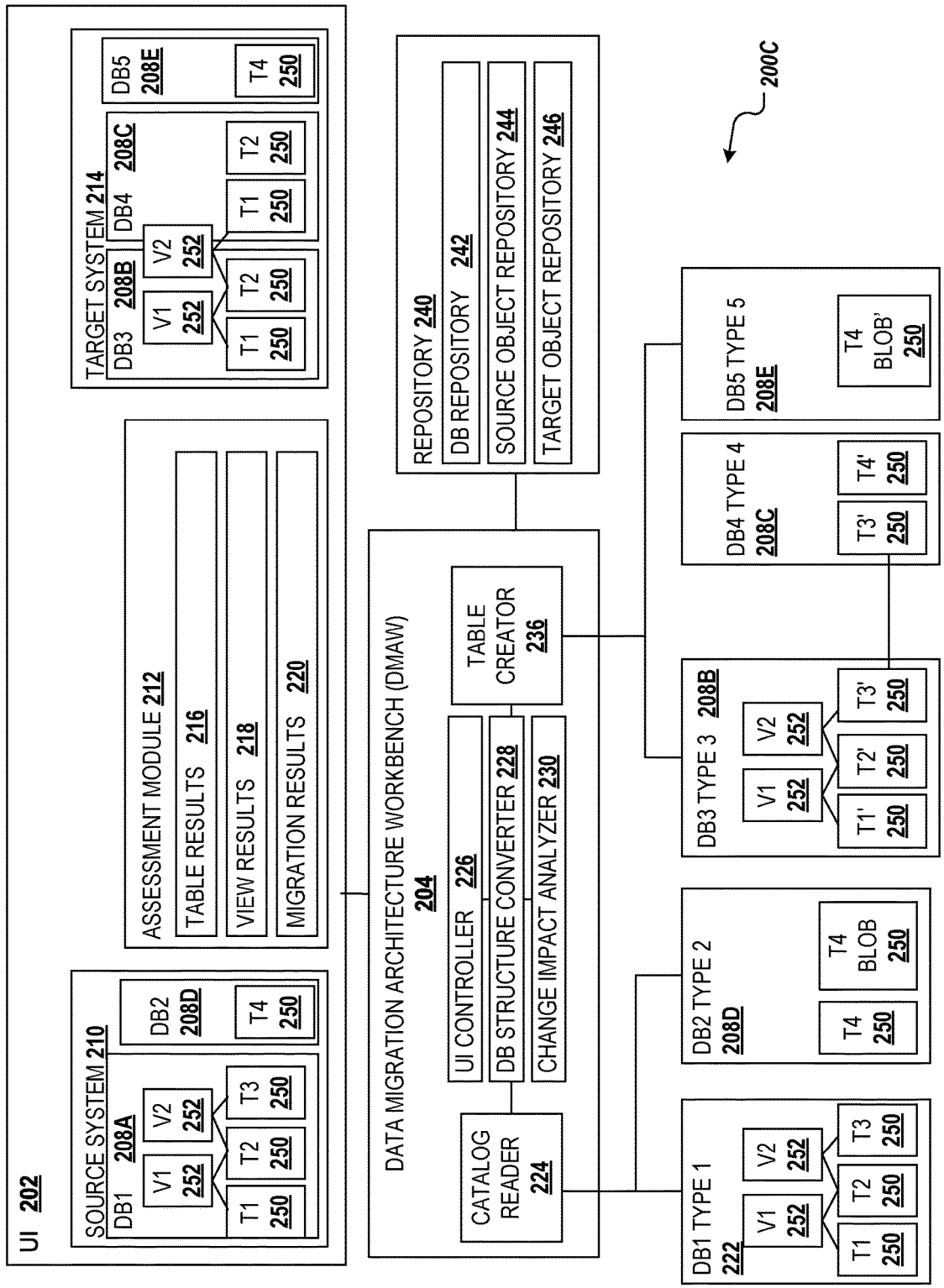

FIG. 2C schematically depicts a portion of an example architecture 200C for DMAW enabling a refactoring process in accordance with implementations of the present disclosure. The example architecture 200C illustrates details of the components of the DMAW 204 used to support the refactoring process, by suggesting and generating virtual tables 252 for database side remote access to enable query of content in other database instances.

As illustrated in FIG. 2C, the UI 202 can receive a user input including a request that specifies databases 208A, 208D used for an old software product version and define a target persistency layout with different databases 208B, 208C, 208E (of a different database type) for a new software product version. The UI 202 can display the current database tables and SQL views (from the source system 210) of the old software product version. The UI 202 can display customer extensions to database tables 250 of the software product. The UI 202 can receive a user input including a request to assign tables 250 to databases 208B, 208C, 208E of the new software product version. The DMAW 204 can compute an initial set of proposed table types, mapped from source database(s) 208A, 208D to target database(s) 208B, 208C, 208E of the respective type(s). The UI 202 can receive a user input including a request to modify the table structure and database types. For example, the UI 202 can receive a user input including a request to "split" or "merge" tables 250. The UI 202 can receive a user input including a request to move tables to different database instances 208B, 208C, 208E. The DMAW 204 can determine a migration impact (as described with reference to FIGS. 2A and 2B) and generate an alert, to be displayed by the UI 202, to warn a user about broken views referencing tables 250 across databases 208B, 208C, 208E and allows the user (developer) to create virtual tables 252 to fix the detected errors (or remove the views if no longer needed). The virtual tables 252 include data flow operators that define the structure of the data corresponding to a table field. The virtual tables 252 can be generated by performing operations (e.g., merging, splitting) on (portions of) one or more tables that can reside within the same or different databases of the same (source or target) system. A view of a table 250 can be selected to be included in a virtual table 252, even if the physical table had been moved out. If such a view exists and developer acknowledges demand for a portion of a table 250 to be outside the new version of the software, a virtual table 252 is created and set up to be used to generate the code to migrate the data out from the primary database 208A, 208D to the target database 208B, 208C, 208E as a virtual table 252 that virtually migrates the data.

The DMAW 204 can process the virtual tables 252 to read database field type definitions and determine if target field types of database instances 208B, 208C, 208E are capable of storing the information available in the source field type of source database(s) 208A, 208D. The DMAW 204 can determine if a computation is possible or not possible (e.g., no direct type mapping but needing an application specific transformation). The DMAW 204 can output a warning statement for identified impossible operations, that the UI 202 can display to trigger a verification of the types of tables to be used for migration or to implement the planned transformation as a plug-in. The DMAW 204 can run a deployment test of the newly defined tables 250 to one or several database instance(s) of the specified type(s) and check for compliance of the table definition with the capabilities of the database type of the databases 208B, 208C, 208E in the target system 214. Deployment errors detected, by the DMAW 204, can be displayed by the UI 202. The UI 202 can receive a user input including a request to adjust tables 250 in response to the deployment errors.

In some implementations, the DMAW 204 provides migration options for the source objects included in the object table, the migration options indicating how respective objects should be handled during the migration process. The DMAW 204 can provide a proposed virtual database table 252 or a different view of a table 250 that might work more efficient than what it was initially planned according to an originally received user input requesting the migration. In some examples, different views of a table 250 can include identification of table objects modified by migration. Example migration options include deleting the object, creating an extension, and fitting the table object to a standard ("fit-to-standard"). In some examples, deleting the table object means that the particular source object would not be created in the table 250 of the target system 214. In some examples, creating an extension includes creating an extension object in the target system 214 with a similar definition to the source object. In some examples, the "fit-to-standard" migration option is only available, if a similar standard object is available, which fits the needs of the customer. In some examples, if a target object is identified for a source object, but in some way deviates from the source object, the DMAW 204 adds the migration option of the target object to the mapping and marks it as "different." In some implementations, if two or more target objects are found to be similar to the source object, the DMAW 204 adds the migration options corresponding to the target objects to an option set with information about the differences. In some examples, the option set is added to the mapping. In some examples, the migration options in the option set can be further ranked by the DMAW 204. In some examples, the migration options in the option sets can be ranked based on parameters regarding cost and time efficiency. In some examples, the ranking of the migration options in the option set can be calculated by using machine learning (ML) models. Specifically, the data set used for ML models can be former uses of the DMAW 204, as well as usage data of the DMAW 204 provided by other customers, companies, or tenants of the server system 108.

In some examples, the UI 202 can receive a user input including an acceptance of the recommendation of the migration option for each object displayed in the refactoring support UI 202. If one of the objects has multiple migration options (e.g., provided in an options set), the UI 202 can enable a selection of one of the migration options from the migration options set. In some examples, the UI 202 can create a self-build or self-defined migration option and automatically execute a selected migration option. In some examples, information regarding the selection made by the user can be collected together with related feature information and can be used as the data for computation of subsequent ML-based ranking, as described above.

Figure 3:
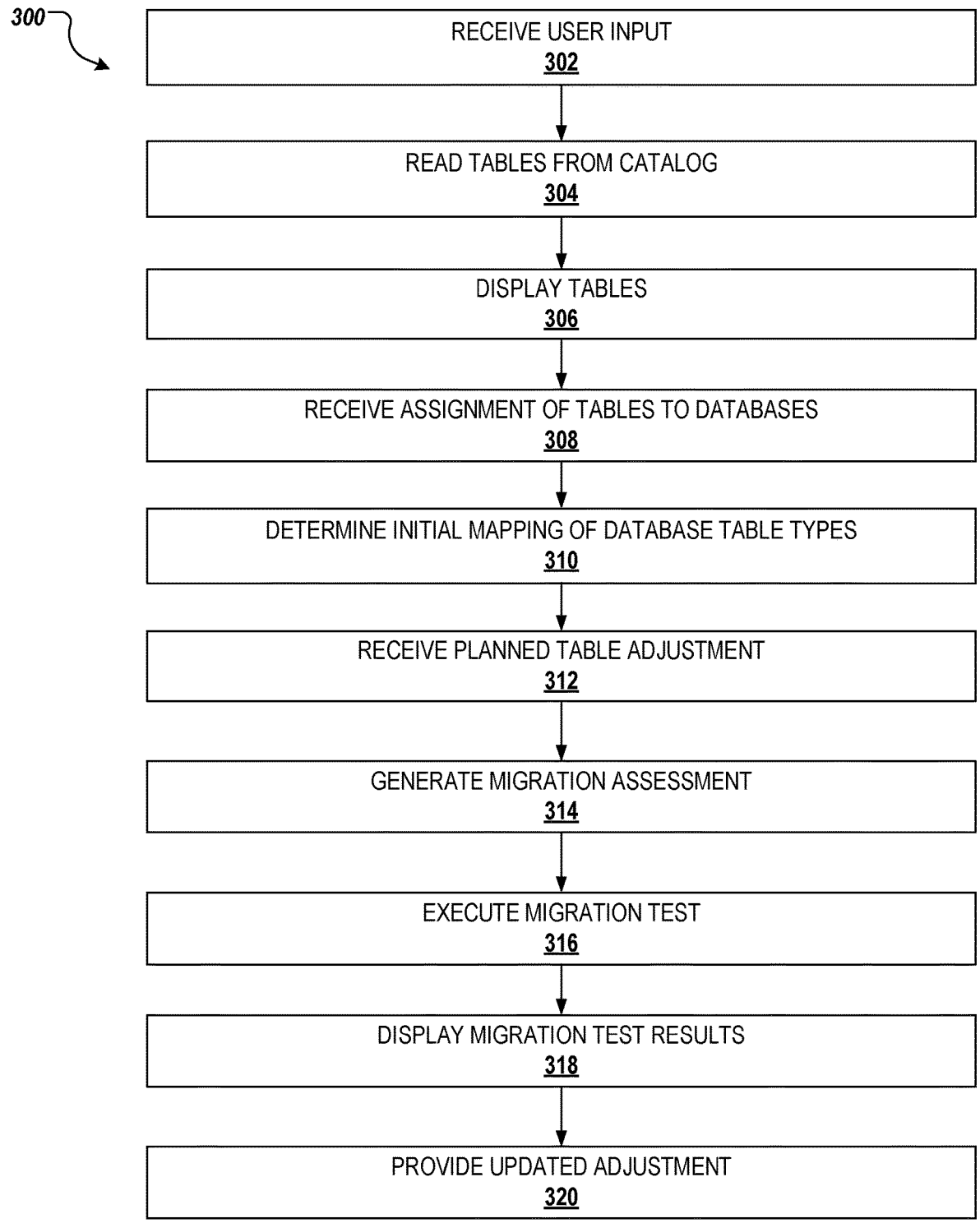
FIG. 3 depicts an example process that can be executed in accordance with implementations of the present disclosure.

FIG. 3 depicts an example process that can be executed in accordance with implementations of the present disclosure. In some examples, the example process 300 is provided using one or more computer-executable programs executed by one or more computing devices (e.g., the server system 108 of FIG. 1). The example process 300 is executed for refactoring an application persistency with migration impact analysis provided early during software product development.

At 302, a user input is received. The user input specifies current databases used for an old software product version. The user input includes a definition of a target persistency layout comprising databases assigned for storing a new software product version, the old software product version comprising one or more database tables and the new software product version comprising an adjustment to the one or more database tables to generate one or more target database tables.

At 304, tables are read from a catalog. Reading tables can include determining custom extensions to the one or more database tables by comparing database key fields and field types of the one or more database tables to standard table characteristics of a basic software product.

At 306, tables are displayed. The display can include displaying structured query language (SQL) views of the old software product version. The SQL views can be assigned to the databases of the new software product version, either as a copy from the old software product version or defining new views from scratch. SQL queries can be gathered from analyzing database logs of the old software product version. A user input can specify, if SQL queries are executed the same way on the target database (and which target tables are to be migrated). If the tables and table fields being queried are available in the target database, which might not be the case of some tables were moved to a different database, views can be adjusted with respect to missing fields or other field-to-table assignments. In some implementations, (e.g., if using a HANA database), a virtual table can be created in one database instance providing access to a second table in another database instance. The virtual table can enable access to missing tables. Once the requirements are met, the SQL statements are created for the target database to test the statements. The developer can create own view statements, adjust statements, and re-iterate deployment, until the create statements work.

At 308, an assignment of tables to databases is received. Tables and views can be assigned to a set of target databases, each providing persistence to a separate microservice. The assignment can be automatically performed based on database types and/or table sizes. It is determined whether views, which had been created in the source database can also be created in the target database (considering the queried tables and table fields). A display can be generated to indicate which views cannot be created any longer. For example, a microservice can be rearchitected into two microservices, each having its own database and tables. Some tables can be assigned to be migrated to a second database and removed from the first one. Joins (or queries) across the new databases can be set to be removed, if no longer needed in the new architecture, or virtual tables can be created to provide transparent remote access.

At 310, an initial mapping of database table types is determined by accessing information of source and target tables and fields and the generated migration code for the tables. The migration mapping source tables to target tables can be specified to optimize the migration process, by bypassing a rediscovery of mapping. If table layout to databases and mapping of source tables to target tables is specified early in the process, the persistency can be designed with the migration impact being known.

At 312, a planned table adjustment is received. The adjustment to the one or more database tables can include at least one of a modification of a table structure or a database type. The adjustment to the one or more database tables can include applying an operation to the one or more database tables. The operation can include at least one of a merge or a split of the one or more database tables.

At 314, a migration assessment of the new software product version is generated based on the sizes of the one or more database tables. The migration assessment can be executed using scenarios defined based on a structure of the old software product version. The scenarios define transformations to the one or more database tables based on one or more determined limitations of the one or more database tables.

The transformations can include merging, splitting and type transformations. Splitting defines a scenario, where one table is transformed into two (or more) tables. The two target tables are potentially part of different database instances. Source and target tables initially have the same database key. A user input can include a definition of the names and location of the tables and can specify, which columns of the source table are part of which target table. Reasons for split operations can be associated with changing cardinalities of parts of the table or for distributing data according to a changed microservices layout. For example, a system restricted to a single contact per customer can be migrated to a more flexible solution. Contacts data are split off into a separate table to enable multiple contacts in different roles for each customer. Optionally, the contacts table can be moved to a different database if contact management is re-architected to become a separate microservice.

Merging defines a scenario, where two tables in the source database are merged to one table in the target database. Reasons for merge operations can be expected performance gains in reading and updating data or changed application requirements. For example, a system restricted to a single country can be migrated to a multi-national solution. The previously used lookup table from ZIP codes to cities is deemed too restrictive. It can be made more flexible and at the same time simpler by providing fields for both ZIP code and city in the new address table. Typically, the two tables can have a foreign key relationship: one field T1-Fx in the source table 1, relates to the key field T2-K1 in source table 2 (this can also be two fields etc.). The developer specifies, that T1 and T2 can merge and which field of T1 has the foreign key relationship with T2 (unless this is specified in the database or as meta data in the application, then the data can be read from these sources). The target table TT has then the fields of the source table T1, including the foreign key relationship field G1-Fx as well as the data fields of the table T2 (all fields except the key T2-K1). The migration code can read a record from T1, read the respective record from T2, where the value of T2-K1 matches the value of T1-Fx. The content of the fields of the target table TT can be determined as values of the fields of T1 and the related entries from T2. The user input can include a request to add more fields to the table and specify default values for the field or a logic, how to compute the values for the new field. If the DMAW is provided access to actual customer databases, it can create statistics on table sizes to provide a quantitative estimation of migration cost: The table sizes can be processed and ranked for display (e.g., the UI can display the biggest table sizes in dark red, the small table sizes in green, and the empty tables in white). The table sizes can be used to provide hints for moving tables in case of an intended database split. If an old software product version database and new software product version databases are of the same type, the option to keep the database instances of a customer and only add database instances and move selected tables can be provided. The system databases with the same type can be displayed.

The transformations can include a split to externalize a binary large object (blob), as a variant of the split procedure. Reason for splitting off large objects can include any of storage requirements, storage limits, and migration cost for migrating the objects from a first (source) database to a second (target) database. For example, large attachments can be migrated out of the database and put into a dedicated object store as this is cheaper and more efficient than storing in the database. If key incompatibly is selected to be changed, a custom migration module can be used to generate the migration code. If a table that can be extended is split, a notification can be generated. A user input can specify, which target table can provide the extension point for a customer extension. If a user input maps the extension to a target table with an incompatible key, the custom migration module can be used to generate the migration code.

The migration assessment can include reading customer extensions to database tables from the source system. The information about the table names in source and target system which match (source can be migrated to target) can be stored. The database key fields and field types of source and target tables that can be extended by customer extensions can be compared. If the database keys of source and target differ, a notification can be generated: The extensions can be migrated generically without the need for custom migration code. In response to mapping the table from source to target, a different database type can be used. The database type change can lead to the situation that a database data type of the source database is no longer present on the target database. In some examples, a user input can include a request to modify the database data type of a field to take advantage of the capabilities of the target database. For example, the source database can be migrated to a more capable database that has broad support for specialized datatypes. The original data storage format of eight digits for year, month, day in a CHAR8 field can be migrated to the specific date type of the target database. The system can generate data migration code. For the field with changed type a set of default conversions is possible to compute from the database type definitions (e.g., INT to FLOAT), for other type changes, the developer is notified to provide a mapping function (e.g., for a "date" stored in a CHAR8 in the form of YYYYMMDD to map to a DATE field in the target database.

At 316, a migration test of the one or more database tables is executed using the migration assessment to generate migration test results. The migration test results include migration parameters comprising migration durations of migration phases and a migration volume weight for the one or more database tables to be moved to a target database. The migration volume weight includes an identification of source database instances and target database instances of a same type comprising a largest migration volume weight. A table volume weight can be determined for the tables in the source database and a migration volume weight for the tables to be moved to the target database can be determined. The system can identify, which source and target database instances of the same type have the highest migration volume weight and provide a hint, that a particular database instance should remain, using an "in-place migration" to decrease the migration time.

At 318, migration test results are displayed, by a user interface of a developer device. The results of a migration test can be displayed, per table size and runtime, for both the online migration and offline migration phases. The results can be evaluated to optimize the migration protocol (defining included transformations and database types) for a potential subsequent migration test iteration.

At 320, an updated adjustment to the one or more database tables and/or the migration code are provided based on the migration test results. For example, a user input can be processed to adjust the code and implement missing migrations for more complex transformations. In some implementations, in response to determining that the adjustment leads to a migration cost below a migration cost threshold, migration is automatically executed.

Compared to typical development of a new software product version with re-architected persistency, the described example process 300 provides early feedback to the developer upon the impact of the re-architected persistency on the migration process, during design of the persistency. Developers can make an informed decision about persistency layout and changes and are earlier aware of impact on migration. Costly migrations can still be accepted, enabling early migration plans to optimize the migration process. Each change is assessed, and migration costs are made transparent, allowing revisions of individual architecture decisions based on migration impact. The generated migration code (with option for developers to plug own modules in) allows running test migrations early in the process. The migration tests provide insight into migration runtime and overall cost, very early in the process.

Figure 4:
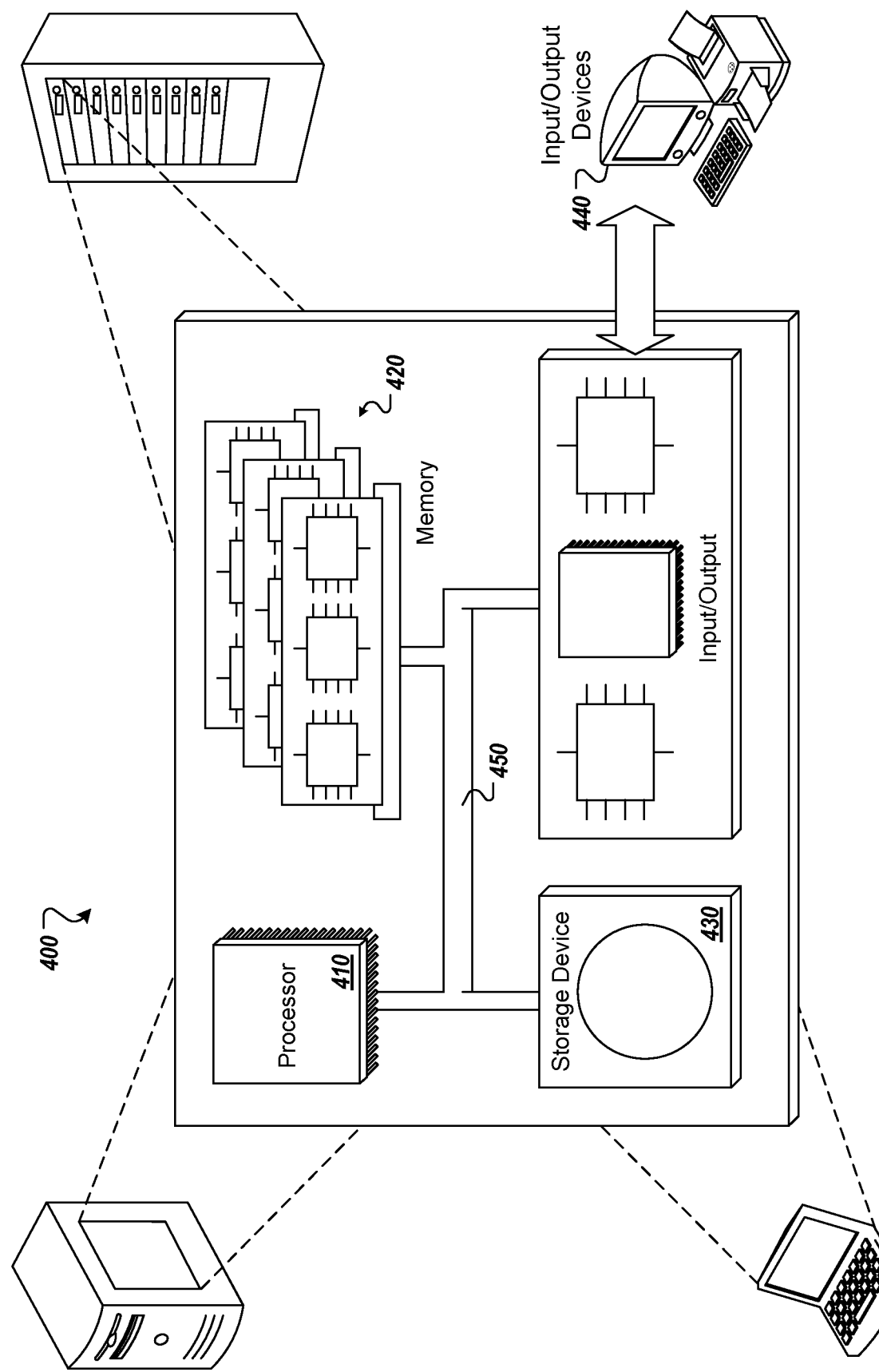
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein, such as the example process 300 described with reference to FIG. 3. For example, the system 400 can be included in any or all of the server components discussed herein, such as components of the example architecture 100 described with reference to FIG. 1 and/or components of example architecture 200A, 200B, 200C described with reference to FIGS. 2A-2C. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 can be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor can receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it can be understood that various modifications can be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, by one or more processors, a user input specifying current databases used for an old software product version, the user input comprising a definition of a target persistency layout comprising databases assigned for storing a new software product version, the old software product version comprising one or more database tables and the new software product version comprising an adjustment to the one or more database tables to generate one or more target database tables; reading, by the one or more processors, sizes of the one or more database tables from a catalog of a database; generating, by the one or more processors, a migration assessment of the new software product version based on the sizes of the one or more database tables; executing, by the one or more processors, a migration test of the one or more database tables using the migration assessment to generate migration test results; and providing, by the one or more processors, an updated adjustment to the one or more database tables based on the migration test results.

Example 2. The computer-implemented method of example 1, further comprising: displaying, by the one or more processors, structured query language (SQL) views of the old software product version.

Example 3. The computer-implemented method of any of the preceding examples, further comprising: determining, by the one or more processors, extensions to the one or more database tables by comparing database key fields and field types of the one or more database tables and of the one or more target database tables.

Example 4. The computer-implemented method of any of the preceding examples, wherein the adjustment to the one or more database tables comprises at least one of a modification of a table structure or a database type.

Example 5. The computer-implemented method of any of the preceding examples, wherein the adjustment to the one or more database tables comprises applying an operation to the one or more database tables.

Example 6. The computer-implemented method of any of the preceding examples, wherein the operation comprises at least one of a merge or a split of the one or more database tables.

Example 7. The computer-implemented method of any of the preceding examples, wherein the migration test results comprise migration parameters comprising migration durations of migration phases and a migration volume weight for the one or more database tables to be moved to a target database.

Example 8. The computer-implemented method of any of the preceding examples, wherein the migration volume weight comprises an identification of source database instances and target database instances of a same type comprising a largest migration volume weight.

Example 9. The computer-implemented method of any of the preceding examples, wherein the migration assessment is executed using scenarios defined based on a structure of the old software product version.

Example 10. The computer-implemented method of any of the preceding examples, wherein the scenarios define transformations to the one or more database tables based on one or more determined limitations of the one or more database tables.

Example 11. A computer-implemented system comprising: memory storing application programming interface (API) information; and a server performing operations comprising: receiving a user input specifying current databases used for an old software product version, the user input comprising a definition of a target persistency layout comprising databases assigned for storing a new software product version, the old software product version comprising one or more database tables and the new software product version comprising an adjustment to the one or more database tables to generate one or more target database tables; reading sizes of the one or more database tables from a catalog of a database; generating a migration assessment of the new software product version based on the sizes of the one or more database tables; executing a migration test of the one or more database tables using the migration assessment to generate migration test results; and providing an updated adjustment to the one or more database tables based on the migration test results.

Example 12. The computer-implemented system of example 11, wherein the operations further comprise: displaying structured query language (SQL) views of the old software product version.

Example 13. The computer-implemented system of any of the preceding examples, wherein the operations further comprise: determining extensions to the one or more database tables by comparing database key fields and field types of the one or more database tables and of the one or more target database tables.

Example 14. The computer-implemented system of any of the preceding examples, wherein the adjustment to the one or more database tables comprises at least one of a modification of a table structure or a database type.

Example 15. The computer-implemented system of any of the preceding examples, wherein the adjustment to the one or more database tables comprises applying an operation to the one or more database tables.

Example 16. The computer-implemented system of any of the preceding examples, wherein the operation comprises at least one of a merge or a split of the one or more database tables.

Example 17. The computer-implemented system of any of the preceding examples, wherein the migration test results comprise migration parameters comprising migration durations of migration phases and a migration volume weight for the one or more database tables to be moved to a target database.

Example 18. The computer-implemented system of any of the preceding examples, wherein the migration volume weight comprises an identification of source database instances and target database instances of a same type comprising a largest migration volume weight.

Example 19. The computer-implemented system of any of the preceding examples, wherein the migration assessment is executed using scenarios defined based on a structure of the old software product version.

Example 20. A non-transitory, computer-readable media encoded with a computer program, the computer program comprising instructions that when executed by one or more computers cause the one or more computers to perform operations comprising: receiving a user input specifying current databases used for an old software product version, the user input comprising a definition of a target persistency layout comprising databases assigned for storing a new software product version, the old software product version comprising one or more database tables and the new software product version comprising an adjustment to the one or more database tables to generate one or more target database tables; reading sizes of the one or more database tables from a catalog of a database; generating a migration assessment of the new software product version based on the sizes of the one or more database tables; executing a migration test of the one or more database tables using the migration assessment to generate migration test results; and providing an updated adjustment to the one or more database tables based on the migration test results.

What is claimed is:

1. A computer-implemented method comprising: receiving, by one or more processors, a user input specifying current databases used for an old software product version, the user input comprising a definition of a target persistency layout comprising databases assigned for storing a new software product version undergoing a development process, the old software product version comprising an application code defining interactions with data stored in one or more database tables and the new software product version comprising an adjustment to the application code associated with a migration of the data to one or more target database tables, the development process comprising an assignment of the data generated by the new software product version, being developed, to the one or more target database tables;
   reading, by the one or more processors, sizes of the one or more database tables from a catalog of a database;
   generating, by the one or more processors, a migration assessment of the new software product version based on the sizes of the one or more database tables, wherein the migration assessment is executed using scenarios defined based on a structure of the old software product version, wherein the scenarios define transformations to the one or more database tables based on one or more determined limitations of the one or more database tables;
   executing, by the one or more processors, a migration test of the one or more database tables using the migration assessment to generate migration test results, wherein the migration test results define an impact of re-design options of the new software product version during the development process; and
   providing, by the one or more processors, an updated adjustment to the one or more database tables and a rearchitecture of the new software product version, during the development process, based on the impact of the re-design options of the new software product version defined by the migration test results.

2. The computer-implemented method of claim 1, further comprising:
   displaying, by the one or more processors, structured query language (SQL) views of the old software product version.

3. The computer-implemented method of claim 1, further comprising:
   determining, by the one or more processors, extensions to the one or more database tables by comparing database key fields and field types of the one or more database tables and of the one or more target database tables.

4. The computer-implemented method of claim 1, wherein the adjustment to the one or more database tables comprises at least one of a modification of a table structure or a database type.

5. The computer-implemented method of claim 1, wherein the adjustment to the one or more database tables comprises applying an operation to the one or more database tables.

6. The computer-implemented method of claim 5, wherein the operation comprises at least one of a merge or a split of the one or more database tables.

7. The computer-implemented method of claim 1, wherein the migration test results comprise migration parameters comprising migration durations of migration phases and a migration volume for the one or more database tables to be moved to a target database.

8. The computer-implemented method of claim 7, wherein the migration test comprises an identification of source database instances and target database instances of a same type.

9. The computer-implemented method of claim 1, wherein the migration assessment comprises generating one or more virtual database tables comprising data flow operators that define table field data structures.

10. The computer-implemented method of claim 9, wherein the migration assessment comprises querying content of a remote database using the one or more virtual database tables.

11. A computer-implemented system comprising:
memory storing application programming interface (API) information; and
a server performing operations comprising:
receiving a user input specifying current databases used for an old software product version, the user input comprising a definition of a target persistency layout comprising databases assigned for storing a new software product version undergoing a development process, the old software product version comprising an application code defining interactions with data stored in one or more database tables and the new software product version comprising an adjustment to the application code associated with a migration of the data to one or more target database tables, the development process comprising an assignment of the data generated by the new software product version, being developed, to the one or more target database tables;
reading sizes of the one or more database tables from a catalog of a database;
generating a migration assessment of the new software product version based on the sizes of the one or more database tables, wherein the migration assessment is executed using scenarios defined based on a structure of the old software product version, wherein the scenarios define transformations to the one or more database tables based on one or more determined limitations of the one or more database tables;
executing a migration test of the one or more database tables using the migration assessment to generate migration test results, wherein the migration test results define an impact of re-design options of the new software product version during the development process; and
providing an updated adjustment to the one or more database tables and a rearchitecture of the new software product version, during the development process, based on the impact of the re-design options of the new software product version defined by the migration test results.

12. The computer-implemented system of claim 11, wherein the operations further comprise:
displaying structured query language (SQL) views of the old software product version.

13. The computer-implemented system of claim 11, wherein the operations further comprise:
determining extensions to the one or more database tables by comparing database key fields and field types of the one or more database tables and of the one or more target database tables.

14. The computer-implemented system of claim 11, wherein the adjustment to the one or more database tables comprises at least one of a modification of a table structure or a database type.

15. The computer-implemented system of claim 11, wherein the adjustment to the one or more database tables comprises applying an operation to the one or more database tables.

16. The computer-implemented system of claim 15, wherein the operation comprises at least one of a merge or a split of the one or more database tables.

17. The computer-implemented system of claim 11, wherein the migration test comprise migration parameters comprising migration durations of migration phases and a migration volume weight for the one or more database tables to be moved to a target database.

18. The computer-implemented system of claim 17, wherein the migration test comprises an identification of source database instances and target database instances of a same type.

19. The computer-implemented system of claim 11, wherein the migration assessment comprises generating one or more virtual database tables comprising data flow operators that define table field data structures.

20. A non-transitory, computer-readable media encoded with a computer program, the computer program comprising instructions that when executed by one or more computers cause the one or more computers to perform operations comprising:
receiving a user input specifying current databases used for an old software product version, the user input comprising a definition of a target persistency layout comprising databases assigned for storing a new software product version undergoing a development process, the old software product version comprising an application code defining interactions with data stored in one or more database tables and the new software product version comprising an adjustment to the application code associated with a migration of the data to one or more target database tables, the development process comprising an assignment of the data generated by the new software product version, being developed, to the one or more target database tables;
reading sizes of the one or more database tables from a catalog of a database;
generating a migration assessment of the new software product version based on the sizes of the one or more database tables, wherein the migration assessment is executed using scenarios defined based on a structure of the old software product version, wherein the scenarios define transformations to the one or more database tables based on one or more determined limitations of the one or more database tables;

executing a migration test of the one or more database tables using the migration assessment to generate migration test results, wherein the migration test results define an impact of re-design options of the new software product version during the development process; and providing an updated adjustment to the one or more database tables and a rearchitecture of the new software product version, during the development process, based on the impact of the re-design options of the new software product version defined by the migration test results.

* * * * *